F. E. DAVIS.
SPIRAL TOOL DRIVER.
APPLICATION FILED JAN. 24, 1910.
979,132.
Patented Dec. 20, 1910.
2 SHEETS—SHEET 2.
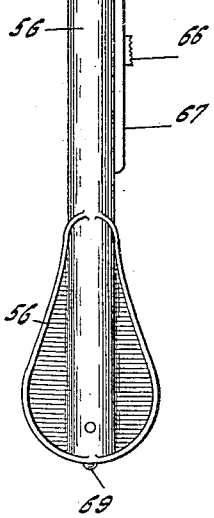
Fig. 3.
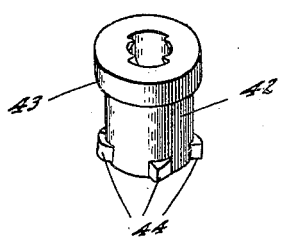
Fig. 6.
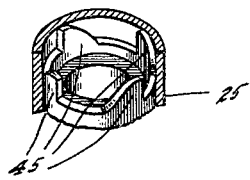
Fig. 7.
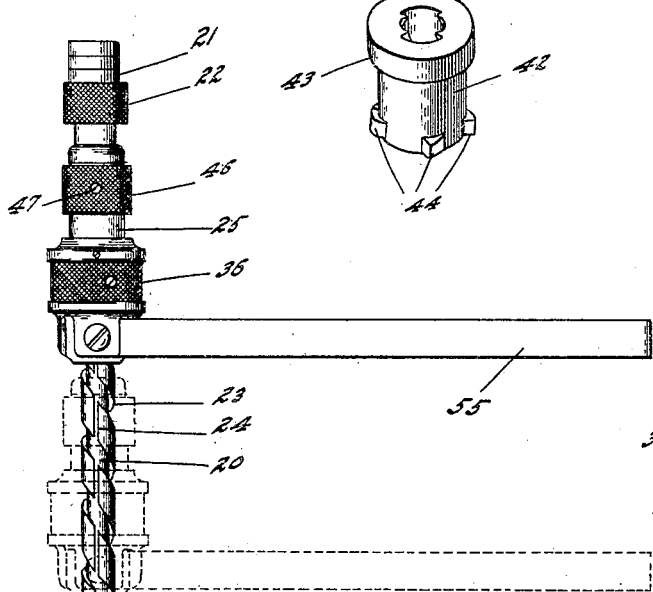
Fig. 8.
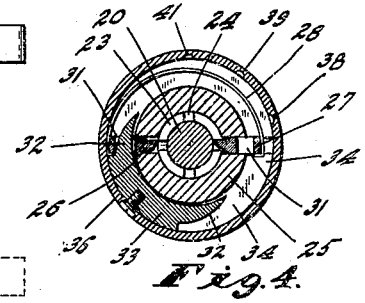
Fig. 4.
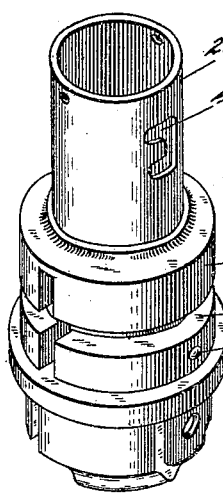
Fig. 5.
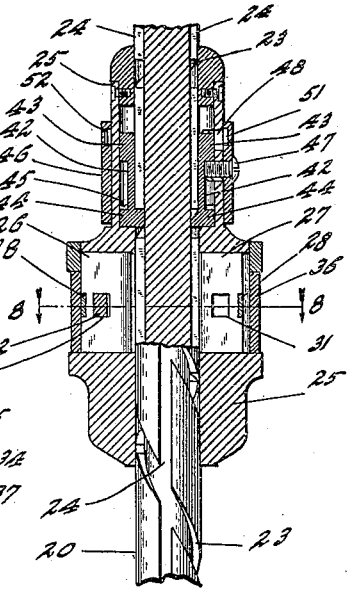
Witnesses
Frank A. Fahle
Thomas W. McMeans
Inventor
Frank E. Davis,
By Bradford Wood
Attorneys
THE NORRIS PETERS CO., WASHINGTON, D. C.

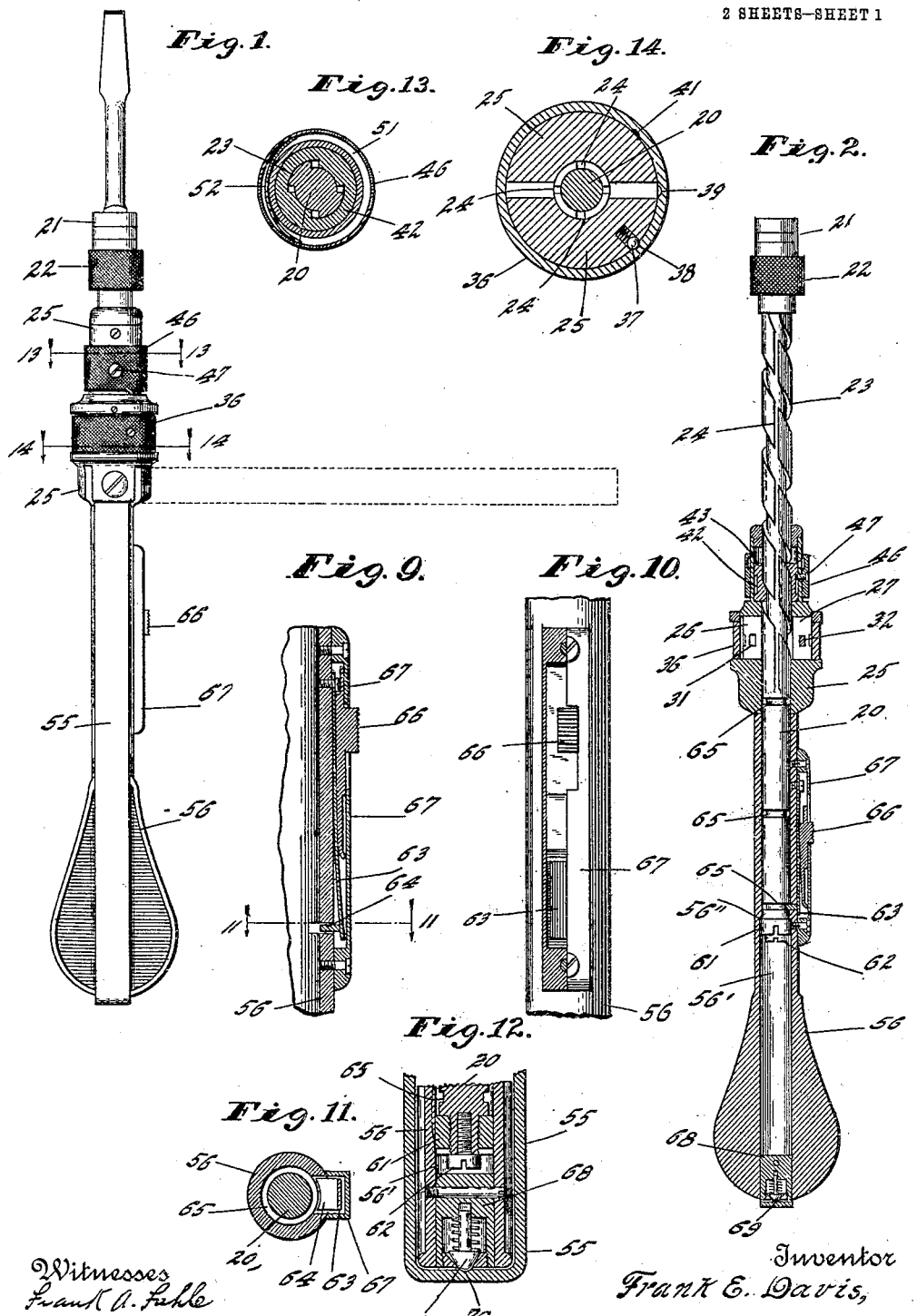

UNITED STATES PATENT OFFICE.

FRANK E. DAVIS, OF INDIANAPOLIS, INDIANA.

SPIRAL TOOL-DRIVER.

979,132.   Specification of Letters Patent.   Patented Dec. 20, 1910.

Application filed January 24, 1910. Serial No. 539,811.

*To all whom it may concern:*

Be it known that I, FRANK E. DAVIS, a citizen of the United States, residing at Indianapolis, in the county of Marion and State of Indiana, have invented certain new and useful Improvements in Spiral Tool-Drivers, of which the following is a specification.

The object of my invention is to produce an improved tool handle of the general type shown in my Patent No. 719,440.

The accompanying drawings illustrate my invention.

Figure 1 is a side elevation of the improved tool; Fig. 2 a longitudinal section; Fig. 3 a side elevation with the parts extended; Fig. 4 a sectional detail, about full size, of the ratchet mechanism; Fig. 5 a perspective detail of the ratchet shell; Fig. 6 a perspective detail of the sliding ratchet nut; Fig. 7 a sectional perspective detail of the toothed portion of the ratchet shell; Fig. 8 a section on line 8 8 of Fig. 4; Fig. 9 a longitudinal section, of the handle lock; Fig. 10 a front elevation, in half section, of the parts shown in Fig. 9; Fig. 11 a section on line 11 11 of Fig. 9; Fig. 12 an enlarged sectional detail of the outer end of the handle and adjacent parts; Fig. 13 a section on line 13—13 of Fig. 1, on an enlarged scale; and Fig. 14 a section on line 14 14 of Fig. 1, on an enlarged scale.

In the drawings, 20 indicates a central stem which, at its outer end, carries a socket head 21 adapted to receive any ordinary bit. Surrounding the stem 20, closely adjacent head 21, is a rotatable sleeve 22 which may be grasped between the fingers of the operator and held during rotation of the stem 20. At an intermediate portion in its length stem 20 is provided with a quick-pitch thread 23 and is also provided with a plurality of straight key ways 24, 24 which extend the entire length over which the thread 23 extends. Freely sleeved upon stem 20 is a ratchet shell 25 which carries a pair of radially arranged, diametrically opposed, pawls 26 and 27 each of which is adapted to enter any one of the key ways 24. The pawls 26 and 27 are oppositely arranged, so as to have an opposite effect upon stem 20, and are normally urged inwardly by means of a spring 28, the opposite ends of which engage the two pawls. Each of the pawls 26 and 27 is provided with an opening 31 into which may be extended one of the wedge shaped toes 32 of a block 33 which is mounted in a circumferential groove 34 formed in shell 25. Said block 33 is carried by a ring 36 which is rotatably mounted on shell 25 and held in any one of three possible positions by means of a spring-pressed ball 37 carried by the shell 25 and adapted to seat in any one of three seats 38, 39 and 41 formed in ring 36.

Threaded upon the threads 23, is a ratchet nut 42 which, at one end, is provided with a circumferential collar 43, and at the opposite end is provided with a plurality of ratchet teeth or lugs 44 which are adapted to be projected into, or withdrawn from, a plurality of corresponding ratchet teeth 45 formed in the interior of shell 25. The ratchet nut 42 has a limited play within shell 25 to an extent slightly greater than the axial length of teeth 45 so that the lugs 44 may be moved into and out of engagement with teeth 45. For the most part this movement of the ratchet nut is automatically produced by a longitudinal movement of the sleeve 25 but at times it is desirable to prevent any engagement of lugs 44 with teeth 45 and for that purpose I journal a collar 46 upon the exterior of shell 25 and project a screw 47 into the space immediately behind collar 43. In order that sleeve 46 may be readily positioned in either of its two positions, I form a U-shaped slot 48 in shell 25 (Fig. 5) through which screw 47 is projected. In order to hold the collar 46 against accidental rotation any suitable means may be provided and for that purpose I have formed a circumferential groove 51 within the collar and have mounted therein a friction spring 52 (Fig. 13) which bears against shell 25.

Longitudinal and rotative movement of shell 25 may be produced in any desired manner and for the purpose of exerting considerable force on the shell I pivot to the rear end of said shell a U-shaped handle or lever 55 which is adapted to be brought into line with stem 20 by being swung over a handle 56 which is sleeved upon the inner end of stem 20.

In order to prevent stem 20 and handle 56 from being accidentally dissociated I secure a nut 61 to the inner end of stem 20 and hold said nut in position by means of the screw 62. The nut 61 is slightly larger in diameter than the adjacent portion of stem 20 and fits within an enlarged bore 56′ of handle 56, the shoulder 56″ being thus formed for engagement by nut 61 to prevent the accidental complete withdrawal of the handle.

It is desirable, in some instances, to adjust the handle 56 relative to stem 20 and for that purpose I secure to the handle a spring 63 which carries a pin 64 at its free end, said pin being projected through the wall of handle 56 and adapted to enter any one of a series of circumferential grooves 65 formed in stem 20. Spring 63 serves to normally hold pin 64 out of line of stem 20 but may be deflected so as to project pin 64 inwardly by means of a sliding thumb piece 66 mounted in a casing 67 which is secured to handle 56 and incases the spring 63. In order to normally hold lever 55 in the position shown in full lines in Fig. 1, I mount, in the end of bore 56′, a plug 68 which carries a common cupboard-catch plunger 69 adapted to take into a shallow socket 70 formed in lever 55.

The operation is as follows: With the lever 55 in the position shown in full lines in Fig. 1 and with collar 46 in its medial position, the tool may be used as an ordinary spiral driver, the stem 20 being rotated in either direction by rotation of the handle structure. By turning collar 46 in either direction from the medial point one or the other of the ratchet dogs 26 and 27 may be thrown out of active position, whereupon the stem 20 will be driven in only one direction by a rotative or axial movement of the handle structure, this action being practically the same as in ordinary structures of this general type. This operation, however, differs from the ordinary operation in that the ratchet dogs 26 and 27 have a straight line engagement with the stem and have no connection with the spiral thread so that, as the handle member is longitudinally moved in the inactive direction, the ratchet nut 42 will be out of engagement with the ratchet teeth 45 and will freely rotate within the shell 25 so as not to exert any material friction upon stem 21 and therefore so as to have no tendency to rotate it in the opposite direction, as is the case in the ordinary constructions. Where a greater driving force is necessary the operator may readily swing the U-shaped lever 55 down to the position shown in dotted lines in Fig. 1, and then use said lever either to cause a rotative reciprocation of shell 25 or a longitudinal reciprocation of such shell. The handle 56 will ordinarily occupy the position shown in Fig. 1, but, on occasion, when a longer tool is required the handle 56 may be readily adjusted on the stem in the manner already described.

I claim as my invention:—

1. A tool handle comprising a central stem having a tool-receiving portion and also having a spiral thread formed therein and a plurality of longitudinally extending key ways in the threaded portion, of a handle member journaled upon said stem, a ratchet shell sleeved upon the threaded portion of the stem, a pair of ratchet dogs carried by said sleeve and adapted to engage in the longitudinal key ways in opposite directions, means for retracting either of said dogs from operative position, a ratchet nut threaded upon the threaded portion of the stem and mounted within the ratchet sleeve, and separable clutch connections carried by said nut and sleeve.

2. A tool handle comprising a central stem having a tool-receiving portion and also having a spiral thread formed therein and a plurality of longitudinally extending key ways in the threaded portion, of a handle member journaled upon said stem, means for longitudinally adjusting said handle upon the stem, a ratchet shell sleeved upon the threaded portion of the stem, a pair of ratchet dogs carried by said sleeve and adapted to engage in the longitudinal key ways in opposite directions, means for retracting either of said dogs from operative position, a ratchet nut threaded upon the threaded portion of the stem and mounted within the ratchet sleeve, and separable clutch connections carried by said nut and sleeve.

3. A tool handle comprising a central stem having a tool-receiving portion and also having a spiral thread formed therein and a plurality of longitudinally extending key ways in the threaded portion, of a handle member journaled upon said stem, a ratchet shell sleeved upon the threaded portion of the stem, a pair of ratchet dogs carried by said sleeve and adapted to engage in the longitudinal key ways in opposite directions, means for retracting either of said dogs from operative position, a ratchet nut threaded upon the threaded portion of the stem and mounted within the ratchet sleeve, separable clutch connections carried by said nut and sleeve, and means for restraining said nut from coöperative action with the sleeve.

4. A tool handle comprising a central stem having a tool-receiving portion and also having a spiral thread formed therein and a plurality of longitudinally extending key ways in the threaded portion, of a handle member journaled upon said stem, means for longitudinally adjusting said handle upon the stem, a ratchet shell sleeved upon the threaded portion of the stem, a pair of ratchet dogs carried by said sleeve and adapted to engage in the longitudinal key ways in opposite directions, means for retracting either of said dogs from operative position, a ratchet nut threaded upon the threaded portion of the stem and mounted within the ratchet sleeve, separable clutch connections carried by said nut and sleeve, and means for restraining said nut from coöperative action with the sleeve.

5. A tool handle comprising a central stem having a tool-receiving portion and also having a spiral thread formed therein and a plurality of longitudinally extending key ways in the threaded portion, of a handle member journaled upon said stem, a ratchet shell sleeved upon the threaded portion of the stem, a pair of ratchet dogs carried by said sleeve and adapted to engage in the longitudinal key ways in opposite directions, means for retracting either of said dogs from operative position, a ratchet nut threaded upon the threaded portion of the stem and mounted within the ratchet sleeve, separable clutch connections carried by said nut and sleeve, and a lever pivotally mounted upon the ratchet shell and movable into and out of alinement with the handle member, substantially as set forth.

6. A tool handle comprising a central stem having a tool-receiving portion and also having a spiral thread formed therein and a plurality of longitudinally extending key ways in the threaded portion, of a handle member journaled upon said stem, means for longitudinally adjusting said handle upon the stem, a ratchet shell sleeved upon the threaded portion of the stem, a pair of ratchet dogs carried by said sleeve and adapted to engage in the longitudinal key ways in opposite directions, means for retracting either of said dogs from operative position, a ratchet nut threaded upon the threaded portion of the stem and mounted within the ratchet sleeve, separable clutch connections carried by said nut and sleeve, and a lever pivotally mounted upon the ratchet shell and movable into and out of alinement with the handle member, substantially as set forth.

7. A tool handle comprising a central stem having a tool-receiving portion and also having a spiral thread formed therein and a plurality of longitudinally extending key ways in the threaded portion, of a handle member journaled upon said stem, a ratchet shell sleeved upon the threaded portion of the stem, a pair of ratchet dogs carried by said sleeve and adapted to engage in the longitudinal key ways in opposite directions, means for retracting either of said dogs from operative position, a ratchet nut threaded upon the threaded portion of the stem and mounted within the ratchet sleeve, separable clutch connections carried by said nut and sleeve, means for restraining said nut from coöperative action with the sleeve, and a lever pivotally mounted upon the ratchet shell and movable into and out of alinement with the handle member, substantially as set forth.

8. A tool handle comprising a central stem having a tool-receiving portion and also having a spiral thread formed therein and a plurality of longitudinally extending key ways in the threaded portion, of a handle member journaled upon said stem, means for longitudinally adjusting said handle upon the stem, a ratchet shell sleeved upon the threaded portion of the stem, a pair of ratchet dogs carried by said sleeve and adapted to engage in the longitudinal key ways in opposite directions, means for retracting either of said dogs from operative position, a ratchet nut threaded upon the threaded portion of the stem and mounted within the ratchet sleeve, separable clutch connections carried by said nut and sleeve, means for restraining said nut from coöperative action with the sleeve, and a lever pivotally mounted upon the ratchet shell and movable into and out of alinement with the handle member, substantially as set forth.

In witness whereof, I, have hereunto set my hand and seal at Indianapolis, Indiana, this tenth day of July, A. D. one thousand nine hundred and nine.

FRANK E. DAVIS. [L. S.]

Witnesses:
ARTHUR M. HOOD,
THOMAS W. MCMEANS.